United States Patent
Agarwal et al.

(10) Patent No.: US 10,028,205 B2
(45) Date of Patent: Jul. 17, 2018

(54) TECHNIQUES FOR WIRELESS LOCAL AREA NETWORK (WLAN) SCANNING IN COEXISTENCE SCENARIOS

(71) Applicant: QUALCOMM Incorporated, San Diego, CA (US)

(72) Inventors: Shivendra Agarwal, Kanpur (IN); Sudhanshu Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 14/971,906

(22) Filed: Dec. 16, 2015

(65) Prior Publication Data

US 2017/0181199 A1 Jun. 22, 2017

(51) Int. Cl.
*H04W 48/16* (2009.01)
*H04W 74/00* (2009.01)
*H04W 4/80* (2018.01)
*H04W 84/12* (2009.01)
*H04W 16/14* (2009.01)
*H04W 84/18* (2009.01)

(52) U.S. Cl.
CPC ............. *H04W 48/16* (2013.01); *H04W 4/80* (2018.02); *H04W 74/002* (2013.01); *H04W 16/14* (2013.01); *H04W 84/12* (2013.01); *H04W 84/18* (2013.01)

(58) Field of Classification Search
None
See application file for complete search history.

(56) References Cited

U.S. PATENT DOCUMENTS

| 2007/0275746 A1* | 11/2007 | Bitran | H04W 72/0446 455/509 |
| 2008/0254745 A1* | 10/2008 | Zhang | H04W 16/14 455/41.2 |
| 2008/0279138 A1 | 11/2008 | Gonikberg et al. | |

(Continued)

OTHER PUBLICATIONS

International Search Report and Written Opinion—PCT/US2016/061978—ISA/EPO—Feb. 24, 2017. (13 total pages).

(Continued)

*Primary Examiner* — Saba Tsegaye
(74) *Attorney, Agent, or Firm* — Arent Fox, LLP and Qualcomm, Incorporated (57) ABSTRACT

The present disclosure describes a method and an apparatus for techniques used for wireless local area network (WLAN) scanning in coexistence scenarios. For example, a method for is provided for WLAN scanning in which a scan of a WLAN is initiated at a wireless device configured to share an antenna for WLAN operations and Bluetooth (BT) operations while a voice call is in progress over the WLAN and packets from the voice call are routed between the wireless device and a BT device. A clear-to-send-to-self (CTS2Self) packet may be broadcast to reserve a communication channel for the wireless device after the scan is initiated. Moreover, a probe request may be broadcast after the broadcast of the CTS2Self packet, where the CTS2Self packet and the probe request are broadcast during a same WLAN interval of the WLAN operations and while the voice call is in progress over the WLAN.

14 Claims, 8 Drawing Sheets

(56) References Cited

U.S. PATENT DOCUMENTS

| | | | | |
|---|---|---|---|---|
| 2009/0137206 A1* | 5/2009 | Sherman | ............... | H04W 16/14 |
| | | | | 455/41.2 |
| 2009/0219904 A1* | 9/2009 | Khairmode | ........... | H04W 88/06 |
| | | | | 370/338 |
| 2012/0129456 A1* | 5/2012 | Xhafa | ................... | H04W 16/14 |
| | | | | 455/63.1 |
| 2013/0155931 A1* | 6/2013 | Prajapati | ............. | H04W 72/044 |
| | | | | 370/311 |

OTHER PUBLICATIONS

Zhu J., et al., "Co-Located Interference Enhancements for Downlink Protection," IEEE Draft, IEEE-SA Mentor, Piscataway, NJ USA, vol. 802.11v, No. 4, Sep. 18, 2007, pp. 1-23, XP017683750 [retrieved on Sep. 18, 2007].

* cited by examiner

TECHNIQUES FOR WIRELESS LOCAL AREA NETWORK (WLAN) SCANNING IN COEXISTENCE SCENARIOS

BACKGROUND

The present disclosure relates generally to communication systems, and more particularly, to techniques for wireless local area network (WLAN) scanning in coexistence scenarios.

Many wireless devices such as smart phones and tablet computers are capable of wireless communication with other devices using multiple technologies including, for example, Wi-Fi signals, BLUETOOTH® (BT or Bluetooth) signals, near field communication (NFC) signals, and cellular signals such as long term evolution (LTE) signals. Because BT signals and some Wi-Fi signals may be transmitted at similar frequencies (e.g., in the ISM band, between approximately 2.4 and 2.5 GHz), it is desirable for wireless devices to reduce the amount of interference between Wi-Fi signals BT signals. For example, when a wireless device is facilitating a voice-over-Internet Protocol (VoIP) call using Wi-Fi signals while also routing audio signals associated with the VoIP call to a wireless headset using BT signals (e.g., in a Synchronous Connection Oriented (SCO) call), transmission of Wi-Fi signals may interfere with reception of BT signals, which in turn may degrade the Mean Opinion Score (MOS) of the SCO call. In such coexistence scenarios, WLAN operations and BT operations of the wireless device may need to be coordinated to reduce interference.

In a related aspect, when the wireless device is moved within a WLAN and/or between WLANs, the wireless device may periodically scan for nearby access points (APs), for example, to identify the best available AP with which to associate. Performing WLAN scanning operations while facilitating an SCO call may further degrade the MOS of the SCO call. Some wireless devices may not perform WLAN scanning operations during SCO calls to minimize interference between Wi-Fi signals and BT signals. However, avoiding WLAN scanning operations during SCO calls may prevent the wireless device from identifying the best available AP with which to associate, which in turn may also degrade the quality of the call when the STA is roaming between APs and/or between wireless networks.

Thus, there is a desire to minimize interference between Wi-Fi signals and BT signals during an SCO call without preventing the wireless device from performing WLAN scanning to identify the best available AP with which to associate.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method for WLAN scanning is provided. The method includes initiating a scan of a WLAN at a wireless device configured to share an antenna for WLAN operations and BT operations while a voice call is in progress over the WLAN and packets from the voice call are routed between the wireless device and a BT device. The method may also include broadcasting a clear-to-send-to-self (CTS2Self) packet for reserving a communication channel for the wireless device after the scan is initiated. The method may further include broadcasting a probe request after the broadcast of the CTS2Self packet, the CTS2Self packet and the probe request being broadcast during a same WLAN interval of the WLAN operations and while the voice call is in progress over the WLAN.

In another example, an apparatus for WLAN scanning is provided. The apparatus includes means for initiating a scan of a WLAN at a wireless device configured to share an antenna for WLAN operations and BT operations while a voice call is in progress over the WLAN and packets from the voice call are routed between the wireless device and a BT device. The apparatus may also include means for broadcasting a clear-to-send-to-self (CTS2Self) packet for reserving a communication channel for the wireless device after the scan is initiated. The apparatus may further include means for broadcasting a probe request after the broadcast of the CTS2Self packet, the CTS2Self packet and the probe request being broadcast during a same WLAN interval of the WLAN operations and while the voice call is in progress over the WLAN.

In a further example, an apparatus for WLAN scanning is provided. The apparatus includes a memory configured to store data and one or more processors communicatively coupled with the memory, wherein the one or more processors and the memory are configured to initiate a scan of a WLAN at a wireless device configured to share an antenna for WLAN operations and Bluetooth (BT) operations while a voice call is in progress over the WLAN and packets from the voice call are routed between the wireless device and a BT device. The apparatus may also include the one or more processors configured to broadcast a clear-to-send-to-self (CTS2Self) packet for reserving a communication channel for the wireless device after the scan is initiated. The apparatus may further include the one or more processors and the memory configured to broadcast a probe request after the broadcast of the CTS2Self packet, the CTS2Self packet and the probe request being broadcast during a same WLAN interval of the WLAN operations and while the voice call is in progress over the WLAN.

Additionally, in another example, a computer-readable medium storing computer executable code for WLAN scanning is provided. The computer-readable medium includes code for initiating a scan of a WLAN at a wireless device configured to share an antenna for WLAN operations and BT operations while a voice call is in progress over the WLAN and packets from the voice call are routed between the wireless device and a BT device. The computer-readable medium may also include code for broadcasting a clear-to-send-to-self (CTS2Self) packet for reserving a communication channel for the wireless device after the scan is initiated. The computer-readable medium may further include code for broadcasting a probe request after the broadcast of the CTS2Self packet, the CTS2Self packet and the probe request being broadcast during a same WLAN interval of the WLAN operations and while the voice call is in progress over the WLAN.

According to another example, a method and an apparatus for WLAN scanning is provided. For example, the method includes identifying that a scan of a WLAN at a wireless device is associated with a non-synchronous connection oriented (non-SCO) call profile, the wireless device being configured to share an antenna for WLAN operations and Bluetooth (BT) operations. The method may also include obtaining information about an upcoming BT interval of the BT operations in response to identifying that the scan is associated with a non-SCO call profile. The method may further include broadcasting a probe request after the BT interval and during a next WLAN interval of the WLAN operations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The example aspects are described below in the context of a mobile or a wireless station (STA) operating in a WLAN system for simplicity only. It is to be understood that the example aspects are equally applicable to other types of devices and/or to other wireless networks (e.g., cellular networks, pico networks, femto networks, satellite networks). As used herein, the terms "wireless local area network (WLAN)" and "Wi-Fi" can include communications governed by the IEEE 802.11 family of standards, and the term "Bluetooth" can include communications governed by the IEEE 802.15 family of standards and/or governed by HiperLAN (a set of wireless standards, comparable to the IEEE 802.11 standards, used primarily in Europe). Further, although described below in terms of an infrastructure WLAN system including one or more APs, the example aspects are equally applicable to other WLAN systems including, for example, multiple WLANs, Independent Basic Service Set (IBSS) networks, ad-hoc networks, peer-to-peer (P2P) networks (e.g., operating according to the Wi-Fi Direct protocols), and/or Hotspots.

In addition, although described herein in terms of exchanging data frames between wireless devices, the example aspects may be applied to the exchange of any data unit, packet, and/or frame between wireless devices. Thus, the term "frame" may include any frame, packet, or data unit such as, for example, protocol data units (PDUs), media access control (MAC) protocol data units (MPDUs), and physical layer convergence procedure protocol data units (PPDUs). The term "A-MPDU" may refer to aggregated MPDUs.

As used herein, the term "associated AP" refers to an AP with which a given STA is associated (e.g., there is an established communication channel or link between the AP and the given STA). The term "non-associated AP" refers to an AP with which a given STA is not associated (e.g., there is not an established communication channel or link between the AP and the given STA, and thus the AP and the given STA may not yet exchange data frames). The term "associated STA" refers to an STA that is associated with a given AP, and the term "non-associated STA" refers to an STA that is not associated with the given AP.

Further, the term "goodput" may refer to an effective data rate of a wireless channel or link between two wireless devices (e.g., between an STA and an AP). When a wireless device such as an STA is moved into the coverage area of a wireless network, it may be desirable for the STA to select the best available AP with which to associate. As used herein, the term "best available AP" may refer to the AP that provides the highest goodput (e.g., as compared with the goodput of other nearby candidate APs). In addition, after the STA becomes associated with a particular AP, it may be desirable for the STA to continually (e.g., periodically) scan the surrounding environment to determine whether one or more other (e.g., non-associated) APs may offer the STA better goodput than the AP with which the STA is currently associated. In some cases, the STA may determine to be preferable to associate with one of the other APs and terminate its current association with the particular AP.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the present aspects. However, it will be apparent to one skilled in the art that these specific details may not be required to practice the present aspects. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

Some portions of this disclosure which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In this disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout this disclosure, discussions utilizing the terms such as "accessing," "receiving," "sending," "using," "selecting," "determining," "normalizing," "multiplying," "averaging," "monitoring," "comparing," "applying," "updating," "measuring," "deriving," "initiating," "broadcasting," "identifying," "obtaining," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various aspects.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that may be accessed, read, and/or executed by a computer or other processor.

The various illustrative logical blocks, modules, circuits and instructions described in connection with the aspects disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

A wireless local area network (WLAN) may be formed by one or more access points (APs) that provide a shared wireless communication medium for use by a number of client devices such as mobile stations (STAs). Each AP, which may correspond to a Basic Service Set (BSS), periodically broadcasts beacon frames to enable any STAs within wireless range of the AP to establish and/or maintain a communication link with the AP. In a typical WLAN, only one STA may use the wireless medium at any given time, and each STA may be associated with only one AP at a time. Due to the increasing ubiquity of wireless networks, when an STA seeks to join a wireless network, the STA may have a choice between multiple wireless networks and/or between multiple APs that form an extended BSS. As the STA is moved into the coverage area of one or more wireless networks, the STA may select the best AP with which to associate. After the STA becomes associated with the selected AP, the STA may be moved within and/or between the coverage area of the one or more wireless networks, and may subsequently benefit from switching its association from the currently associated AP to one of a number of candidate APs (e.g., APs with which the STA is not associated), for example, to achieve the highest possible data rate.

As mentioned above, when a wireless device such as an STA is facilitating a VoIP call using Wi-Fi signals and routing audio signals associated with the VoIP call to, for example, a wireless headset using BT signals, transmission of the Wi-Fi signals may interfere with reception of the BT signals, which is undesirable. Although this interference may be reduced by preventing the STA from scanning for nearby APs during the voice call, WLAN scanning operations are desirable to identify the best available AP with which to associate, especially when the STA is moving within a given WLAN and/or between WLANs and there may be a deterioration of the effective data rate of the wireless channel or link with the currently associated AP. Thus, in accordance with the example aspects, a wireless device such as an STA may be configured to complete WLAN scanning operations during an SCO call only when there is a likelihood of identifying a better AP with which to associate. In this manner, the frequency of WLAN scanning operations during SCO calls may be reduced (e.g., as compared with wireless devices that always perform WLAN scanning operations during SCO calls) without sacrificing the ability to identify the best available AP with which to associate (e.g., as compared with wireless devices do not perform WLAN scanning operations during SCO calls). Similarly, an STA may be configured to complete WLAN scanning operations in non-SCO BT profiles only when there is a likelihood of identifying a better AP with which to associate. These are at least some of the technical solutions provided by the example aspects to the aforementioned technical problems, as discussed in detail below.

Figure 1:
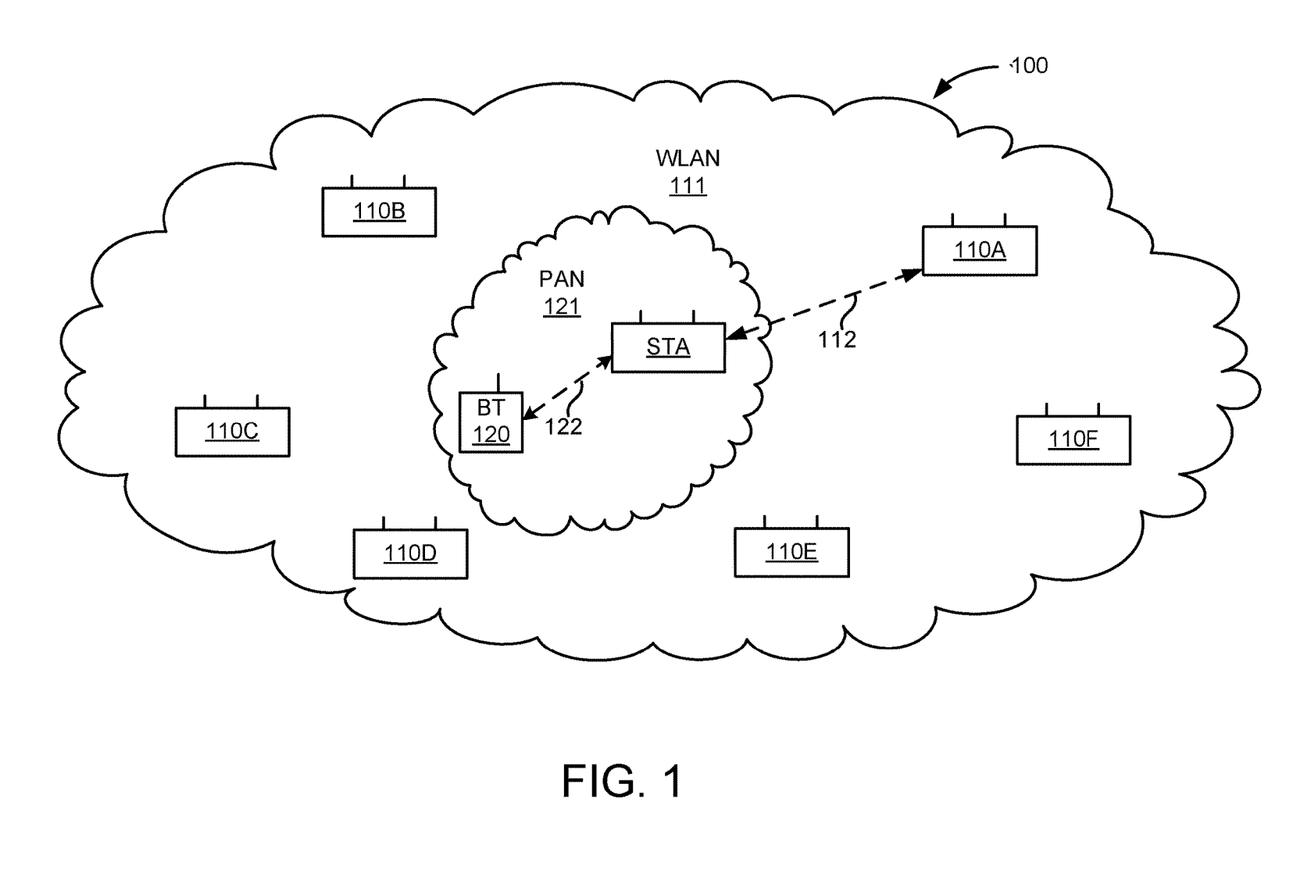
FIG. 1 is a block diagram of a wireless system within which the example aspects may be implemented.

FIG. 1 is a block diagram of a wireless system 100 within which the example aspects may be implemented. The wireless system 100 is shown to include a wireless station (STA), a plurality of wireless access points (APs) 110A-110F, a wireless local area network (WLAN) 111, a Bluetooth device/headset 120, and a personal area network (PAN) 121. The WLAN 111 may be formed by any number of APs, e.g., APs 110A-110F that may operate according to the IEEE 802.11 family of standards (or according to other suitable wireless protocols). Although six APs 110A-110F are shown in the example of FIG. 1, it is to be understood that WLAN 111 may be formed by any number of access points. Each of the APs 110A-110F is assigned a unique media access control (MAC) address that may be programmed therein by, for example, the manufacturer of the AP. Similarly, the STA may also be assigned with a unique MAC address. Once the STA is authenticated to and associated with an AP, the STA and the AP may exchange data with each other over a shared wireless channel or link.

More specifically, establishing a Wi-Fi connection between an AP and an STA typically involves a number of steps to be completed before the STA and the AP may begin exchanging data with each another. First, the STA typically scans all available channels (e.g., by broadcasting probe requests and/or by listening for beacon frames) to identify APs and/or other devices that are within wireless range of the STA. Each available AP may respond to the probe requests by transmitting, to the STA, a probe response containing basic service set (BSS) information pertaining to that AP's network. Next, the STA selects one of the APs with which to associate. For example, the STA may select the AP having the highest signal strength or having the highest goodput. Then, authentication may be performed between the STA and AP and the STA may associate with the selected AP.

For the example illustrated in FIG. 1, the STA is associated with AP 110A, and may exchange signals or frames with AP 110A via a Wi-Fi link 112. The other APs 110B-110F are not associated with the STA, and are therefore deemed to be non-associated APs. Although the STA is currently associated with AP 110A, the STA may be moved within the WLAN 111 and/or into the coverage area of one or more other wireless networks (not shown for simplicity), and therefore may subsequently benefit from switching its association from AP 110A to another one of APs 110B-110F in WLAN 111 or to an AP corresponding to another wireless network.

The PAN 121, which may also be referred to as a Bluetooth network, may be created by pairing the STA and the BT device 120 so that data may be exchanged between the STA and BT device 120 via a Bluetooth link 122. For example, when the STA is facilitating a voice call, the STA may route audio signals as a Synchronous Connection Oriented (SCO) call via the Bluetooth link 122 to BT device 120. The STA may facilitate the voice call using cellular signals or using Wi-Fi signals. For the example aspects described herein, the voice call facilitated by the STA may be a VoIP call for which data frames containing audio signals related to the voice call are exchanged with an associated one of the APs 110A-110F over a shared wireless channel or communication link using Wi-Fi signals. In an additional example, when the STA is using a non-SCO BT profile, the STA may stream audio data (e.g., associated with a non-SCO profile such as an advanced audio distribution profile (A2DP) via the BT link 122 to BT device 120).

Figure 8:
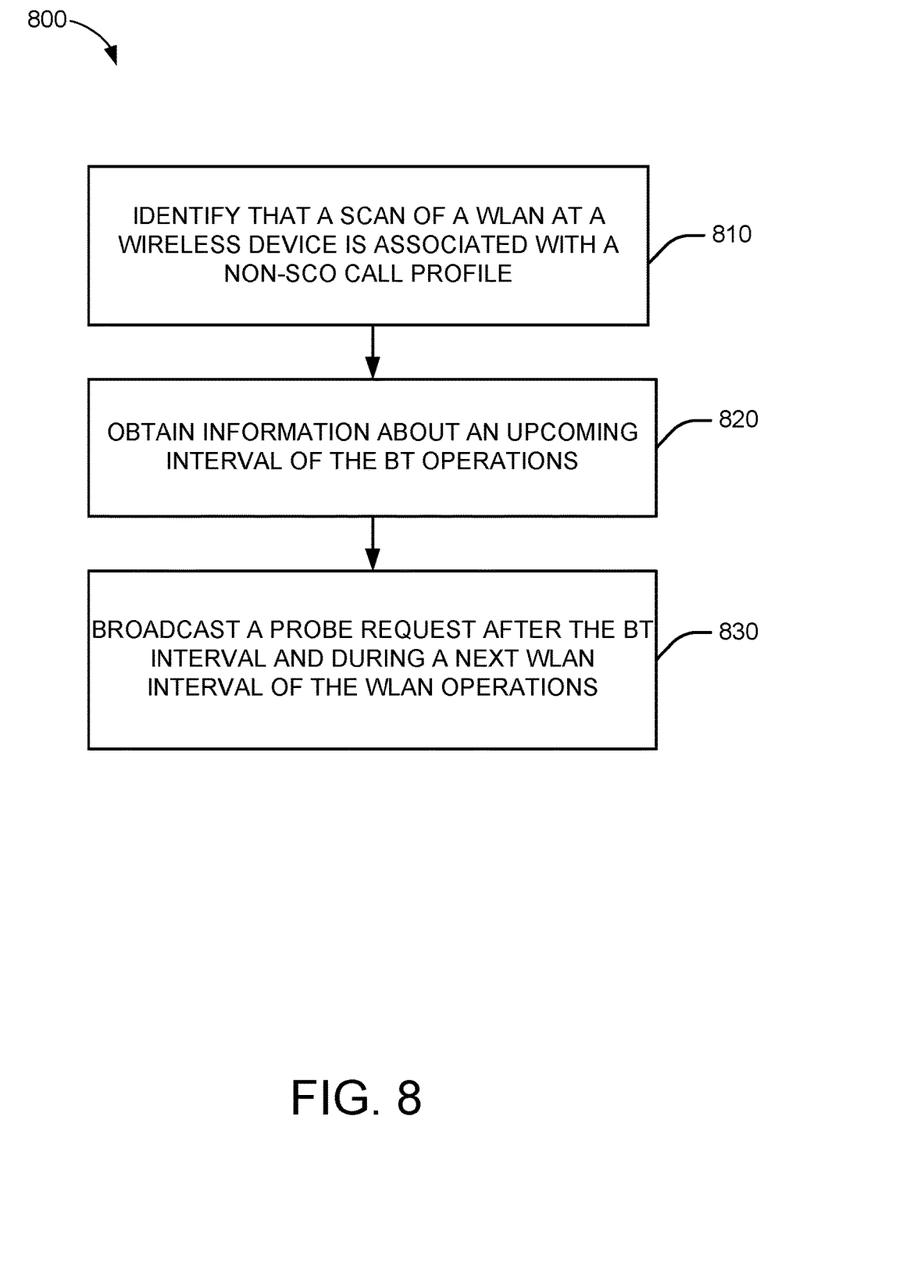
FIG. 8 illustrates an example methodology for wireless local area network (WLAN) scanning at a wireless device.

The STA may be any suitable Wi-Fi enabled wireless device including, for example, a mobile station (MS), personal digital assistant (PDA), tablet device, laptop computer, or the like. The STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some aspects, the STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6 and/or 8.

The APs 110A-110F may be any suitable device that allows one or more wireless devices to connect to a network (e.g., a local area network (LAN), wide area network (WAN), metropolitan area network (MAN), and/or the Internet) via any of the APs 110A-110F using Wi-Fi, Bluetooth, or any other suitable wireless communication standards. For at least one aspect, each of APs 110A-110F may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 6.

For the STA and/or APs 110A-110F, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band, and/or within a 60 GHz frequency band. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., Global System for Mobile (GSM) communications, Universal Mobile Telecommunications System (UMTS) protocols). In other aspects, the transceivers included within the STA and/or the APs 110A-110F may be any technically feasible transceiver such as a ZigBee transceiver described by a specification from the ZigBee specification, a WiGig transceiver, and/or a HomePlug transceiver described a specification from the HomePlug Alliance.

As mentioned above, for wireless devices (e.g., STAs) that include co-located Bluetooth (BT) and WLAN transceivers, it is desirable for coexistence of BT and WLAN operations to reduce interference between BT signals and Wi-Fi signals, particularly when both the BT signals and the Wi-Fi signals are transmitted at similar frequencies (e.g., in the ISM band, between approximately 2.4 and 2.5 GHz). More specifically, even though BT signals may utilize adaptive frequency hopping (AFH) techniques to avoid specific frequencies used by Wi-Fi transmissions, AFH techniques may not adequately mitigate interference, especially when the WLAN transceivers and the BT transceivers are integrated into the same device (e.g., as in the STA of FIG. 1). Thus, when a wireless device such as the STA of FIG. 1 is facilitating an SCO call via BT device 120, the concurrent transmission and/or reception of Wi-Fi signals may interfere with the exchange of BT signals between the STA and BT device 120, thereby degrading the audio quality (e.g., the MOS) of the SCO call. Additionally, when a wireless device such as the STA of FIG. 1 is facilitating a non-profile call via BT device 120, the concurrent transmission and/or reception of Wi-Fi signals may interfere with the exchange of BT signals between the STA and BT device 120, thereby degrading the quality of the A2DP audio stream.

In one example, the interference between Wi-Fi signals and BT signals may be especially high when the STA is facilitating a VoIP call and routing audio signals associated with the VoIP call to BT device 120. Further, as the STA moves within the WLAN 111, it is desirable for the STA to perform WLAN scanning operations to ensure that the STA is associated with the best available AP, for example, so that the VoIP call is not dropped. However, as mentioned above, WLAN scanning operations may further increase interference between Wi-Fi signals and BT signals, which in turn may further degrade the quality of the VoIP call. In addition, for aspects in which the STA's BT transceivers and WLAN transceivers share the same antenna, performing WLAN scanning operations during an SCO call may undesirably reduce an amount of antenna resources allocated for exchanging BT signals between the STA and the BT device 120.

Figure 2:
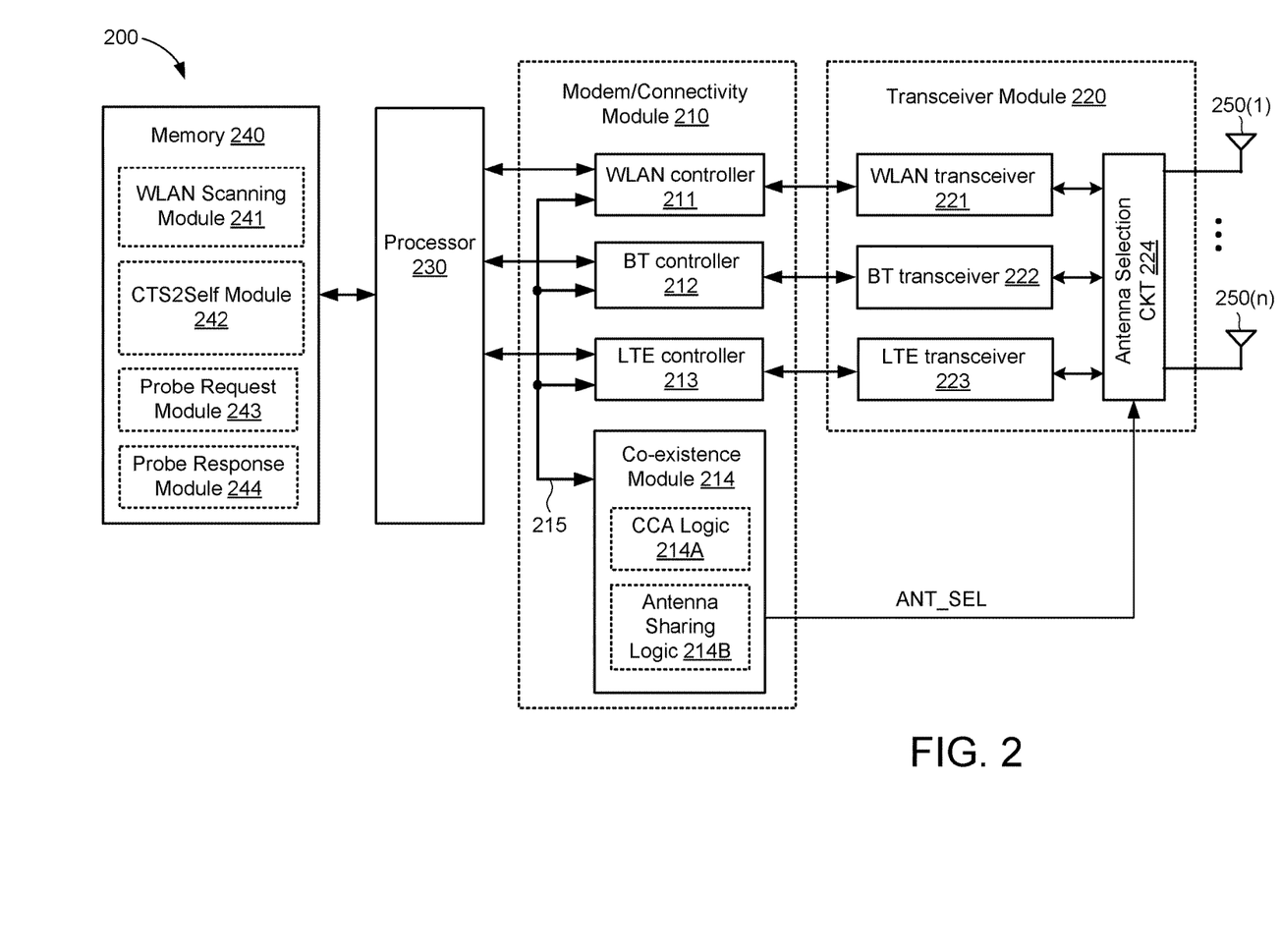
FIG. 2 is a block diagram of one aspect of a STA.

FIG. 2 is a block diagram of an STA 200 that may be one aspect of the STA of FIG. 1. STA 200 is shown to include a modem/connectivity module 210, a bus 215, a transceiver module 220, a processor 230, a memory 240, and a number of antennas 250(1)-250(n). The modem/connectivity module 210 includes a WLAN controller 211, a Bluetooth controller 212, an LTE controller 213, and a co-existence module 214. The WLAN controller 211 is configured to control the transmission and reception of Wi-Fi signals for STA 200. The Bluetooth controller 212 is configured to control the transmission and reception of Bluetooth signals for STA 200. The LTE controller 213 is configured to control the transmission and reception of LTE signals (or other suitable cellular signals) for STA 200.

The WLAN controller 211, Bluetooth controller 212, and LTE controller 213 may be coupled to processor 230 via separate signal lines, and may be coupled to each other and to co-existence module 214 via bus 215. For some aspects, the bus 215 is a Wireless Co-existence Interface (WCI) bus that may operate according to one or more Bluetooth standards. For such aspects, the WCI bus 215 may be used to exchange synchronization messages and status information between WLAN controller 211, Bluetooth controller 212, LTE controller 213, and/or co-existence module 214. For at least some aspects, the WLAN controller 211 and Bluetooth controller 212 may correspond to a wireless connectivity module.

The co-existence module 214 may include Clear Channel Assessment (CCA) logic 214A and antenna sharing logic 214B. CCA logic 214A may be used by co-existence module 214 to determine whether the Wi-Fi wireless channel has been idle for a certain amount of time (e.g., corresponding to the delay period as discussed in more detail below in reference to FIG. 5). CCA logic 214A may use CCA techniques to sense or determine whether the wireless channel is idle or busy.

Antenna sharing logic 214B may selectively route signals associated with the WLAN controller 211, the Bluetooth controller 212, and/or the LTE controller 213 to one or more of the antennas 250(1)-250(n) for transmission from the STA 200. For example, when the WLAN controller 211 is not transmitting or receiving data, the antenna sharing logic 214B may provision more antenna resources to the Bluetooth controller 212; conversely, when the Bluetooth controller 212 is not transmitting or receiving data, the antenna sharing logic 214B may provision more antenna resources to the WLAN controller 211.

Antenna sharing logic 214B may also allocate transmission time slots (or intervals) to the WLAN controller 211 and to the Bluetooth controller 212 when the WLAN controller 211 and the Bluetooth controller 212 are to share one or more of antennas 250(1)-250(n). More specifically, for example aspects in which the WLAN controller 211 and the Bluetooth controller 212 are to share a single antenna, the antenna sharing logic 214B may implement an antenna sharing policy by dividing each of a number of antenna sharing time periods into a WLAN time slot (or WLAN interval) and a BT time slot (or BT interval). Thereafter, the STA 200 may transmit and receive Wi-Fi signals using the single antenna during the WLAN time slots, and may transmit and receive BT signals using the single antenna during the BT time slots. For at least one example aspect, the transmit time period is approximately 4 milliseconds (ms), the WLAN time slot occupies approximately 2.5 ms of each of the 4 ms transmit time periods, and the BT time slot occupies approximately 1.5 ms of each of the 4 ms transmit time periods. For at least one other example aspect of a non-SCO profile, the transmit time period is approximately 70 ms, the WLAN time slot occupies approximately 45 ms of each of the 70 ms transmit time periods, and the BT time slot occupies approximately 25 ms of each of the 70 ms transmit time periods.

Although shown in FIG. 2 as separate components, the functionality of the WLAN controller 211, Bluetooth controller 212, LTE controller 213, and/or co-existence module 214 may be implemented on the same integrated circuit (IC) chip. For other aspects, the WLAN controller 211, Bluetooth controller 212, LTE controller 213, and/or co-existence module 214 may share one or more components on the same chip. Additionally, the various components (not shown for simplicity) within processor 230, WLAN controller 211, Bluetooth controller 212, LTE controller 213, and/or co-existence module 214 may be implemented in a variety of ways including, for example, using analog logic, digital logic, processors (e.g., CPUs, DSPs, microcontrollers, and so on), application specific integrated circuits (ASICs), field programmable gate arrays (FPGAs), or any combination of the above. Further, modem/connectivity module 210 may include not only digital processing circuitry but also analog processing circuitry.

Transceiver module 220, which is coupled between modem/connectivity module 210 and antennas 250(1)-250(n), is shown in the example of FIG. 2 as including a WLAN transceiver 221, a Bluetooth transceiver 222, an LTE transceiver 223, and/or an antenna selection circuit 224. The WLAN transceiver 221 may route Wi-Fi signals between WLAN controller 211 and the antennas 250(1)-250(n) via antenna selection circuit 224. The Bluetooth transceiver 222 may route Bluetooth signals between Bluetooth controller 212 and the antennas 250(1)-250(n) via antenna selection circuit 224. The LTE transceiver 223 may route LTE signals between LTE controller 213 and the antennas 250(1)-250(n) via antenna selection circuit 224. Although not shown in FIG. 2 for simplicity, each of transceivers 221-223 may include any suitable circuits (e.g., power amplifiers, filters, up-samplers, down-samplers, analog-to-digital converters, digital-to-analog converters, mixers, etc.) to facilitate the transmission and reception of corresponding wireless signals. Further, although not shown in FIG. 2, the WLAN transceiver 221, the Bluetooth transceiver 222, and/or the LTE transceiver 223 may each include any suitable number of transmit chains and receive chains.

The antenna selection circuit 224, which is coupled between transceivers 221-223 and antennas 250(1)-250(n), may selectively couple each of transceivers 221-223 to any of the antennas 250(1)-250(n) in response to an antenna select signal (ANT_SEL). The ANT_SEL signal may be generated by the co-existence module 214. More specifically, for example aspects described herein, the ANT_SEL signal may be generated by antenna sharing logic 214B in accordance with the aforementioned antenna sharing policy. For example, if Wi-Fi and BT communications associated with STA 200 are to share the first antenna 250(1), then the antenna sharing logic 214B may drive the ANT_SEL signal to a first state that couples the first antenna 250(1) to the WLAN transceiver 221 during the WLAN time slots, and may drive the ANT_SEL signal to a second state that couples the first antenna 250(1) to the BT transceiver 222 during the BT time slots.

The co-existence module 214 may coordinate the transmission/reception of Wi-Fi signals with the transmission/reception of BT signals, for example, to reduce interference between the Wi-Fi signals and the BT signals. For some aspects, the co-existence module 214 may receive Wi-Fi transmit/receive information from the WLAN controller 211, and may receive BT transmit/receive information from the Bluetooth controller 212. For other aspects, the co-existence module 214 may receive Wi-Fi transmit/receive information and/or BT transmit/receive information from processor 230.

Memory 240 may include a WLAN scanning module 241 that stores profile information for a plurality of devices such as APs, Bluetooth devices, and/or other STAs. The profile information for a particular device may include information including, for example, the device's service set identifier (SSID), MAC address, channel information, received signal strength indicator (RSSI) values, supported data rates, BT pairing information, and/or any other suitable information pertaining to or describing the operation of the device.

Memory 240 may also include a computer-readable medium (e.g., one or more nonvolatile memory elements, such as EPROM, EEPROM, Flash memory, a hard drive, and so on) that can store the following software (SW) modules: a WLAN scanning module 241, a CTS2Self module 242, a probe request module 243, and/or a probe response module 244 to initiate WLAN scans, identify call profiles (e.g., SCO and/or non-SCO profiles), broadcast CTS2Self packets, broadcast probe requests, receive probe responses, obtain information of WLAN and/or BT time slots, in accordance with the example aspects, for example, as described for one or more operations of FIGS. 5-8; and a co-existence module 214 to manage the co-existence of WLAN and BT communications associated with STA 200 (e.g., during a VoIP and/or SCO call; non-SCO profile).

Each software module includes instructions that, when executed by processor 230, cause STA 200 to perform the corresponding functions. The computer-readable medium of memory 240 thus includes instructions for performing all or a portion of the operations depicted in FIGS. 5 and 7, aspects of which are also described in FIGS. 6 and 8.

Figure 3:
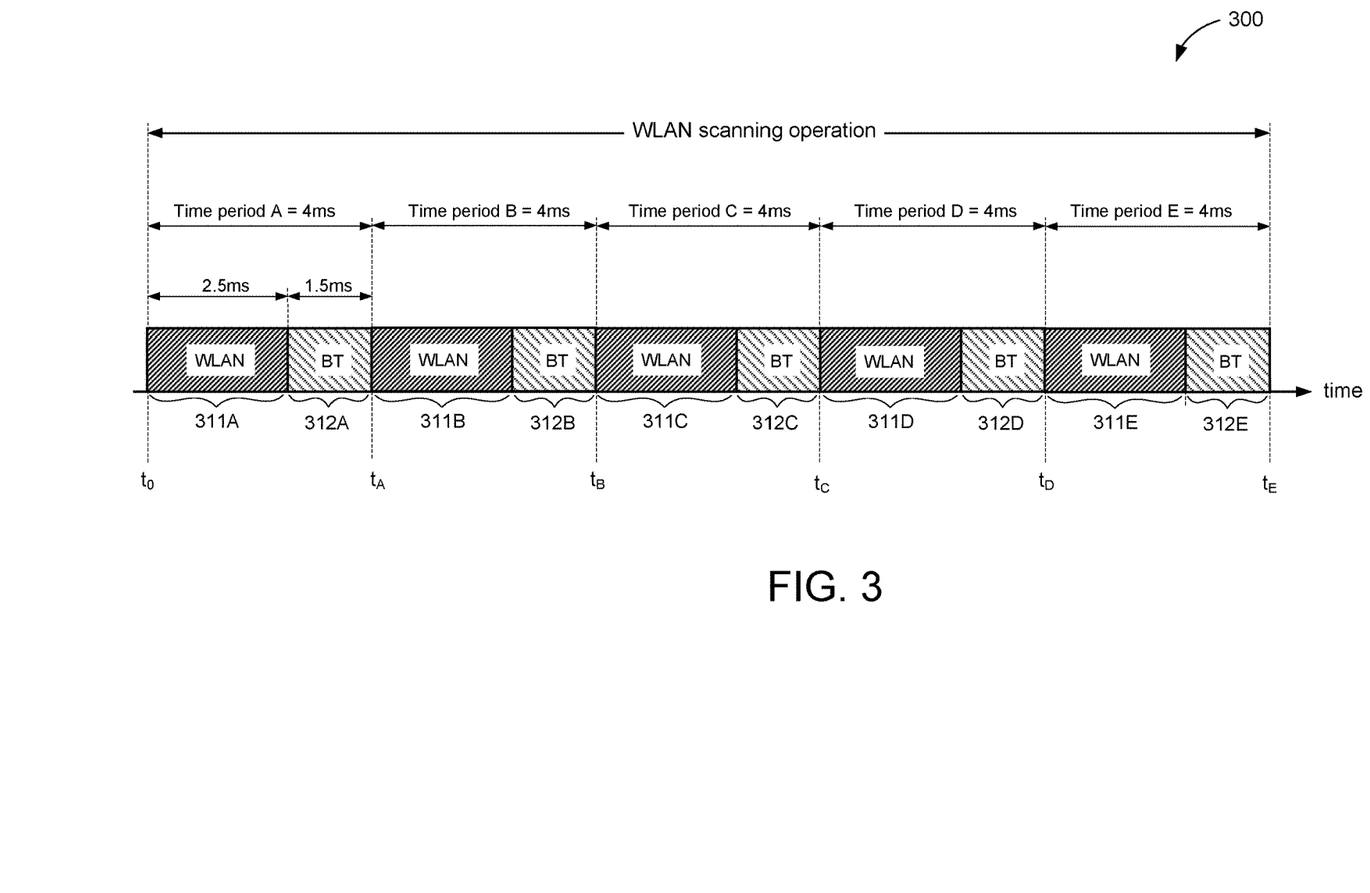
FIG. 3 illustrates a timing/sequence diagram depicting an example scanning operation in accordance with some aspects.

FIG. 3 illustrates a timing diagram 300 depicting an example scanning operation in accordance with some aspects.

In an aspect, the WLAN scanning operation may spread over a number of the time periods which may include both WLAN and BT time slots as a single antenna is shared between WLAN and BT communications, as described in detail above in reference to FIG. 2. For example, a typical WLAN scanning operation for a SCO call may take between approximately 20 to 40 ms to complete. Thus, for the above-mentioned example in which each a 4 ms antenna sharing time period is divided into a 2.5 ms WLAN time slot and a 1.5 ms BT time slot, performing a full WLAN scanning operation may take 5-10 consecutive WLAN time slots (interleaved with BT time slots). An example scenario is illustrated in FIG. 3 which shows allocation of the shared antenna (e.g., antenna 250(1) divided into a number of antenna sharing time periods A-E). Additionally, for an example non-SCO call, a 70 ms antenna sharing time period is divided into a 45 ms WLAN time slot and a 25 ms BT time slot, and a full WLAN scanning operation may be performed in one WLAN time slot as the WLAN time slots for non-SCO calls are much larger than the SCO calls.

For instance, each of the time periods A-E may have a duration of 4 ms, and may be divided into a WLAN time slot with a duration of 2.5 ms and a BT time slot with a duration of 1.5 ms. For example, the first time period A lasts from time $t_0$ to time $t_A$ and includes a first WLAN time slot 311A and a first BT time slot 312A; the second time period B lasts from time $t_A$ to time $t_B$ and includes a second WLAN time slot 311B and a second BT time slot 312B, and so on.

In an aspect, in order to reduce interference between WLAN and BT transmissions, STA 200 may instruct the one or more APs in WLAN 111 to delay sending probe responses by a delay period which for at least some aspects may include, e.g., equal to or greater than remaining time of the current WLAN time slot plus the duration of next immediate BT time slot. The instructions to the one or more APs to delay sending probe responses may ensure that the BT time slots using the shared antenna of STA 200 are not compromised after a probe request (i.e., by the probe responses transmitted by the APs) is broadcast by the STA 200 to initiate the WLAN scanning operations. In an additional or optional aspect, STA 200 may instruct the APs to delay sending probe responses by broadcasting a particular CTS (Clear-to-Send) frame called a CTS2Self frame. As described below in reference to FIG. 4, the CTS2Self frame may specify the delay period for which the APs are to delay sending probe responses to STA 200.

Figure 4:
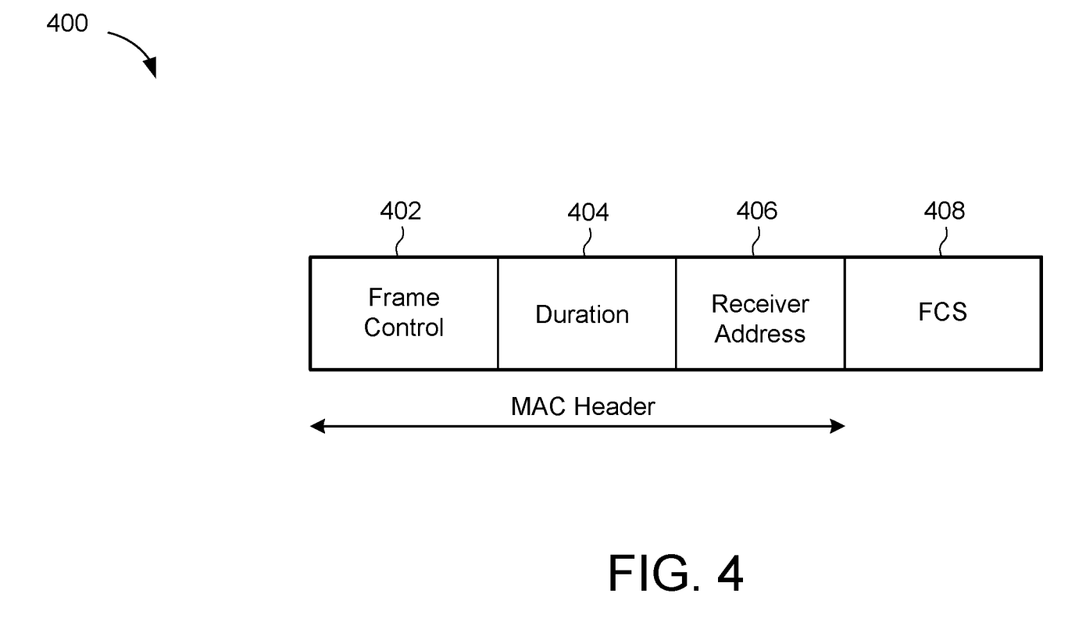
FIG. 4 illustrates an example CTS2Self frame structure in accordance with an example aspect.

FIG. 4 illustrates an example CTS2Self frame 400 structure in accordance with an example aspect. The CTS2Self frame 400 is shown to include a frame control field 402, a duration field 404, a receiver address (RA) field 406, and a frame control sequence (FCS) field 408. The frame control field 402, the duration field 404, and the RA field 406 together are generally considered as a medium access control (MAC) header, as defined in 802.11 Specifications.

In an aspect, the frame control field 402 may contain control information used for defining the type of MAC frame and provides information (e.g., protocol version, type and subtype, power management, etc.) necessary for other fields to process the frame. The duration field 404 is generally used for indicating the remaining duration needed to receive the next frame transmission. The RA field 406 contains the MAC address of the transmitter (e.g., STA 200) to reserve the shared wireless medium for transmissions intended for STA 200 for a duration indicated in the duration field 404. For example, in an aspect, STA 200 may store the value of delay period as described below in reference to FIG. 5 in the duration field 404 to ensure that the BT time slots are not compromised or interrupted by probe responses from one or more APs in response to a probe request broadcast by STA 200.

Figure 5:
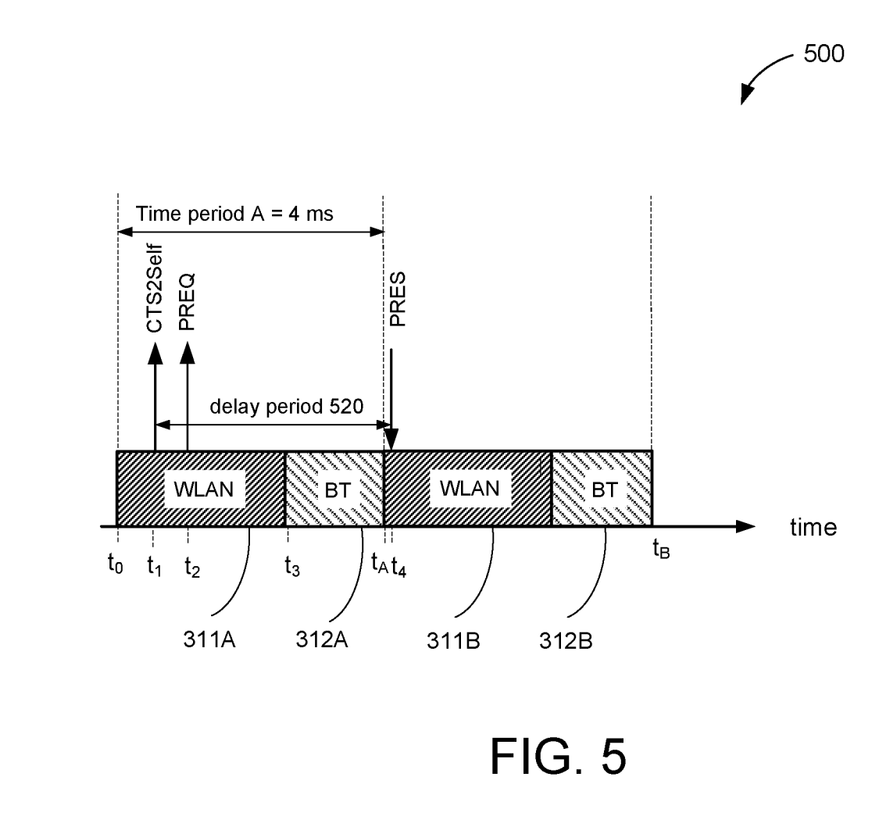
FIG. 5 illustrates an example timing/sequence diagram depicting an example scanning operation in accordance with some aspects of the present disclosure.

FIG. 5 illustrates an example timing diagram 500 depicting an example scanning operation in accordance with some aspects of the present disclosure.

For example, in an aspect, referring to FIGS. 1 and 2, STA 200 is facilitating a voice call (e.g., VoIP/SCO call) using WLAN transceiver 221 and BT transceiver 222 on a shared antenna 250(1) at time $t_0$. As shown in FIG. 5, at or just after time $t_0$, STA 200 may initiate a WLAN scanning operation to identify the best available AP for STA 200 to associate. For instance, STA 200 may initiate a WLAN scanning operation by broadcasting a probe request. However, prior to broadcasting the probe request, in an aspect, STA 200 may broadcast a CTS2Self packet with a delay period 520 inserted into the CTS2Self packet (as described above in reference to FIG. 4) to reserve the medium (e.g., a channel) for STA 200. This ensures that the probe responses from the APs (e.g., APs 110A-F) and any other communications on the medium/channel do not interfere with the operations of BT device 120 during BT time slot 312A. As described above in reference to FIG. 4, when STA 200 broadcasts the CTS2Self packet, STA 200 stores (e.g., sets) the value of delay period in the duration field 404 of the CTS2Self packet.

For instance, when CTS2Self packet is broadcast by STA 200, STA 200 may set the value of duration field 404 to protect the BT communications during time slot 312A from interference. In an aspect, STA 200 may set the duration field 404 to a value which is equal to time remaining in the current WLAN time slot (e.g., $t_3-t_1$) plus duration of the next BT time slot (e.g., $t_4-t_3$). That is, delay period 520 is set to a value of $(t_3-t_1)+(t_4-t_3)$. Further, once the delay period expires, e.g., after $t_4$, APs may start sending probe response to STA 200. Once STA 200 receives a probe response either in the current WLAN time slot (e.g., 311A) or the next WLAN time slot (e.g., 311B), STA 200 may move to the next channel for WLAN scanning, as described in FIG. 3 above.

In an additional or optional aspect, STA 200 may determine if there is enough time for STA 200 to receive probe responses prior to broadcasting CTS2Self packet. For example, if STA 200 determines that not enough time is left in the current WLAN time slot 311A (e.g., just 1 ms left in the current WLAN time slot 311A), STA 200 may not broadcast CTS2Self packet and instead may wait until the start of the next WLAN time slot. In a further additional or optional aspect, STA 200 (e.g., at $t_2$) may determine if there is enough time for STA 200 to receive probe responses prior to broadcasting a probe request. For example, if STA 200 determines that not enough time is left in the current WLAN time slot 311A (e.g., just 1 ms left in the current WLAN time slot 311A), STA 200 may not broadcast a probe request as the time left (e.g., 1 ms) left in the current WLAN time slot may not be enough for broadcasting of the probe request and/or for receiving the probe responses from the APs, especially if the probe response are large.

Therefore, in some aspects, under the scenarios described above, STA 200 may defer broadcasting of the CTS2Self packet until the start of the next WLAN time slot (e.g., $t_4$), defer broadcasting of the probe request until the start of the next WLAN time slot (e.g., $t_4$), and/or delay receiving of the probe responses until the next WLAN time slot (e.g., $t_4$).

Figure 6:
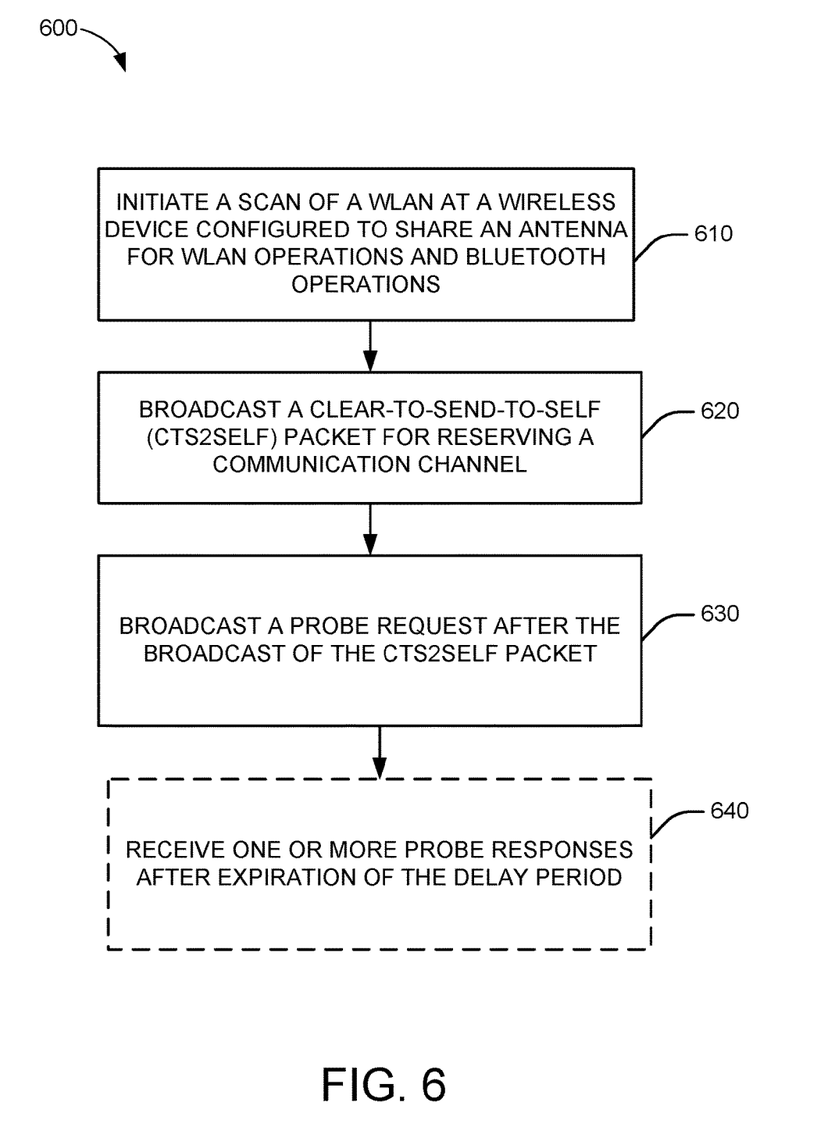
FIG. 6 illustrates an example methodology for wireless local area network (WLAN) scanning at a wireless device.

FIG. 6 illustrates an example methodology 600 for wireless local area network (WLAN) scanning at a wireless device.

In an aspect, at block 610, methodology 600 may include initiating a scan of a WLAN at a wireless device configured to share an antenna for WLAN operations and Bluetooth (BT) operations while a voice call is in progress over the WLAN and packets of the voice call are routed between the wireless device and a BT device. For example, in an aspect, STA 200, transceiver module 220, and/or WLAN scanning module 241 may include a specially programmed processor module, or a processor executing specially programmed code stored in a memory, to initiate a scan of WLAN 111 at STA 200 configured to share an antenna (e.g., 222(1)) for WLAN operations and Bluetooth (BT) operations while a voice call is in progress over WLAN 111 and packets of the voice call are routed between the wireless device (e.g., STA 200) and a BT device (e.g., BT device 120).

For example, in an aspect, as described above in detail in reference to FIG. 2, STA 200 shares an antenna with BT device 120 and STA 200 initiates a WLAN scan to identify whether another AP is available that is the better than the AP the STA 200 is currently associated. That is, STA 200 initiates a WLAN scan to identify whether one of the neighboring APs (e.g., APs 110B-F) is a better AP for association (e.g., for connection). This may be based on whether one of the other neighboring APs offers better performance, e.g., greater goodput, higher RSSI values, etc., than the current associated AP 110A. In an additional or optional aspect, STA 200 may initiate a WLAN scan when STA 200 is roaming (e.g., moving). In such a scenario, STA 200 may detect that the AP 110A which STA 200 is associated with is transmitting a weak signal and STA 200 may initiate a WLAN scan to identify whether a better AP is available for association.

Additionally, when a voice call (e.g., SCO call) is in progress at STA 200, packets of the voice call may be routed between STA 200 and BT device 120. That is, voice packets are transmitted from STA 200 to BT device 120 and/or from BT device 120 to STA 200. For instance, STA 200 and/or transceiver module 220 may identify whether the voice call at STA 200 is a SCO call based on whether the voice call is associated with a SCO profile which may be stored at STA 200, e.g., memory 240 of FIG. 2.

In an aspect, at block 620, methodology 600 may include broadcasting a CTS2Self packet for reserving a communication channel for the wireless device after initiating the scan. For example, in an aspect, STA 200, transceiver module 220, and/or CTS2Self module 242 may include a specially programmed processor module, or a processor executing specially programmed code stored in a memory, to broadcast a CTS2Self packet for reserving a communication channel for STA 200 after initiating the scan. For instance, when STA 200 initiates a WLAN scan, STA 200 may broadcast a CTS2Self packet to reserve the medium for its communications, as described above in reference to FIG. 4. In an aspect, for example, STA 200 may broadcast CTS2Self packet with RA field 406 set to its own address and duration filed 404 set to a delay period 520 (FIG. 5) so that the APs delay responses to the probe request broadcast by STA 200.

In an aspect, at block 630, methodology 600 may include broadcasting a probe request after the broadcast of the CTS2Self packet, the CTS2Self packet and the probe request being broadcast during a same WLAN interval of the WLAN operations and while a voice call is in progress over the WLAN. For example, in an aspect, STA 200, transceiver module 220, and/or probe request module 243 may include a specially programmed processor module, or a processor executing specially programmed code stored in a memory, to broadcast a probe request (e.g., at $t_2$) after the broadcast of the CTS2Self packet (e.g., at $t_1$), the CTS2Self packet and the probe request being broadcast during a same WLAN time slot (e.g., 311A) of the WLAN operations and while the voice call is in progress over the WLAN. That is, STA 200 may broadcast the probe request in the same WLAN time slot in which STA 200 had earlier broadcast the CTS2Self packet.

In an optional aspect, at block 640, methodology 600 may include receiving one or more probe responses after expiration of the delay period. For example, in an aspect, STA 200, transceiver module 220, and/or probe response module 244 may include a specially programmed processor module, or a processor executing specially programmed code stored in a memory, to receive one or more probe responses after expiration of the delay period (e.g., at $t_4$). For instance, the probe responses from one or more APs 110B-F that may have been delayed due to the delay period 520 set in the CTS2Self packet may have expired, and STA 200 may receive the probe responses from one or more APs 110B-F.

In an additional or optional aspect, STA 200 may also use the methodology described above (FIG. 6) for receiving data after power-save polling (ps-poll). For instance, STA 200 may enter a power-save mode by sending a null frame to AP 110A with the power management bit set. Once AP 110A receives the null frame from STA 200 with the power management bit set, AP 110A stores all packets destined to STA 200 in a per-STA queue at AP 110A and sets traffic indication map (TIM) field in the beacon frame to indicate that packets destined for STA 200 have been queued at AP 110. STA 200 wakes up from sleep every listen interval to receive the beacon frames from APs and when STA 200 detects that the TIM field for it has been set, STA 200 sends a ps-poll frame to AP 110A. In response to receiving the ps-poll frame from STA 200, AP 110A may send the first queued frame to STA 200 and STA 200 receives the queued data frame. If the "more data" field in the frame received from AP 110A is set, STA 200 sends another ps-poll frame to AP 110A. STA continues to send ps-poll frames to receive all the queued frames and when none are left, STA 200 goes back to sleep until the next listen interval. For example, in an aspect, STA 200 may use CTS2Self packet to guide reception of data after ps-poll during the WLAN time slot to avoid interfering with BT time slots. That is, STA 200 may calculate the time leftover in the current WLAN slot after which antenna is required to be switched for non-WLAN (e.g., BT) operations. In an aspect, based on the time calculated, STA 200 may transmit a CTS2Self frame prior to transmitting a ps-poll frame (e.g., CTS2Self frame precedes ps-poll frame) and the AP (e.g., AP 110) may not transmit data to STA 200 for the duration identified in the CTS2Self frame.

As such, STA 200 may perform a WLAN scan without interfering with the operations of BT device 120.

Figure 7:
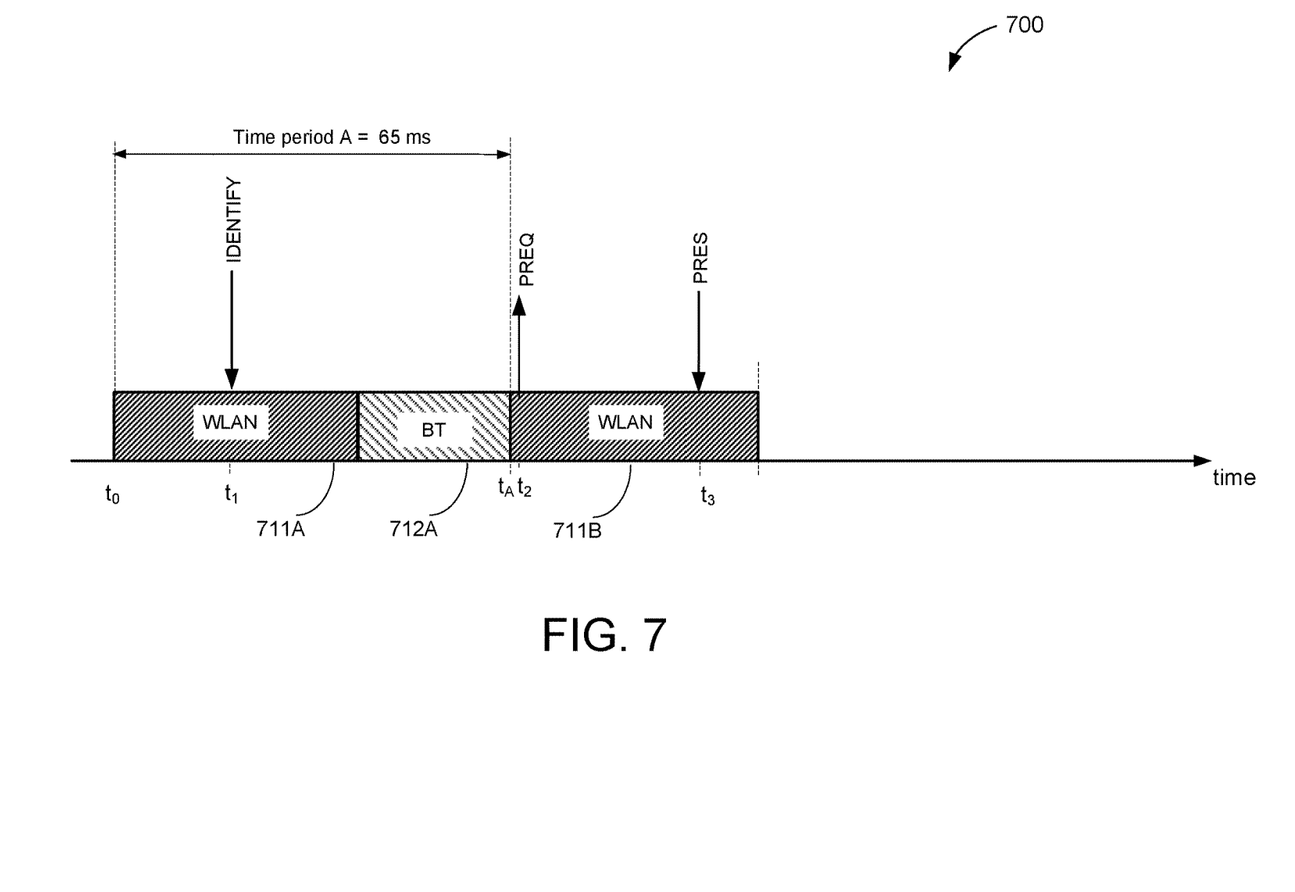
FIG. 7 illustrates an example timing/sequence diagram depicting an example scanning operation in accordance with some aspects of the present disclosure.

FIG. 7 illustrates an example timing diagram 700 depicting an example scanning operation in accordance with some aspects of the present disclosure.

For example, in an aspect, referring to FIGS. 1 and 2, STA 200 may be facilitating a non-SCO profile, e.g., an advanced audio distribution profile (A2DP), using the WLAN transceiver 221 and the BT transceiver 222 on a shared antenna 250(1) at time $t_0$. As shown in FIG. 7, at $t_1$, STA 200 may identify that a scan of a WLAN initiated at $t_1$ may be associated with a non-SCO profile with STA 200 configured to share an antenna for WLAN operations and Bluetooth (BT) operations.

In an aspect, after STA 200 identifies that WLAN is associated with a non-SCO profile, STA 200 may obtain information about an upcoming (e.g., next) BT time slot of the BT operations. This allows STA 200 to determine if STA 200 has enough time to broadcast a probe request and receive probe responses prior to the start of the next BT time slot (that is, within the current WLAN time slot, e.g., 711A) so that the probe responses do not interfere with BT communications in the BT time slot (e.g., 712A). The information may be obtained (e.g., queried, retrieved, requested/received, etc.) from the BT controller 212, BT transceiver 222, and/or memory 240.

For example, if STA 200 determines that there is not enough time for STA 200 to broadcast a probe request and receive probe response within WLAN time slot 711A, STA 200 may delay sending the probe request (e.g., by queuing the probe request) until the beginning of the next WLAN time slot, e.g., time $t_4$ of WLAN time slot 711B, and in one aspect may delay broadcast of the probe request until time $t_2$. This provides STA 200 enough time to send the probe request and receive the probe response within WLAN time slot 711B, e.g., at time $t_3$. This may be possible as the duration of time slots in non-SCO profiles is much larger than the time slots of SCO profiles.

As such, STA 200 may perform a WLAN scan without interfering with the operations of BT device 120.

FIG. 8 illustrates an example methodology 800 for wireless local area network (WLAN) scanning at a wireless device.

In an aspect, at block 810, methodology 800 may include identifying that a scan of a WLAN at a wireless device is associated with a non-synchronous connection oriented (non-SCO) call profile, the wireless device being configured to share an antenna for WLAN operations and Bluetooth (BT) operations. For example, in an aspect, STA 200, transceiver module 220, and/or WLAN scanning module 241 may include a specially programmed processor module, or a processor executing specially programmed code stored in a memory, to identify that a scan of WLAN 111 at STA 200 device is associated with a non-SCO call profile, the wireless device (e.g., STA 200) being configured to share an antenna for WLAN operations and Bluetooth (BT) operations (e.g., BT device 120).

For example, in an aspect, as described above in detail in reference to FIG. 2, STA 200 shares an antenna with BT device 120 and STA 200 initiates a WLAN scan to identify whether another AP is available that is the better than the AP the STA 200 is currently associated. That is, STA 200 initiates a WLAN scan to identify whether one of the neighboring APs (e.g., APs 110B-F) is a better AP for association (e.g., for connection). This may be based on whether one of the other neighboring APs offers better performance, e.g., greater goodput, higher RSSI values, etc., than the current associated AP 110A. In an additional or optional aspect, STA 200 may initiate a WLAN scan when STA 200 is roaming (e.g., moving). In such a scenario, STA 200 may detect that the AP 110 which STA 200 is associated with is transmitting a weak signal and STA 200 may initiate a WLAN scan to identify whether a better AP is available for association.

For instance, in an aspect, once WLAN is initiated at STA 200, the STA may identify that scan of the WLAN is associated with a non-SCO profiled based on profile stored at STA 200. For example, in an aspect, the non-SCO profile may be A2DP profile.

In an aspect, at block 820, methodology 900 may include obtaining information about an upcoming BT interval of the BT operations in response to identifying that the scan is associated with a non-SCO call profile. For example, in an aspect, STA 200, transceiver module 220, and/or WLAN scanning module 241 may include a specially programmed processor module, or a processor executing specially programmed code stored in a memory, to obtain information about an upcoming BT interval of the BT operations (e.g., duration of the BT time slot) in response to identifying that the scan is associated with a non-SCO call profile.

For example, the information obtained may include the duration of BT time slot and/or WLAN time slot. For non-SCO profiles such as A2DP profiles, the BT time slots and/or the WLAN time slots are much larger than the SCO time slot. For instance, for A2DP profile, WLAN time slot may be 45 ms and/or BT time slot may be 25 ms. The larger time slots allow for sending of the probe requests and/or reception of the probe responses in the time slots so that the WLAN scan operations do not interfere with BT time slots. For instance, obtaining information about the upcoming (or next) BT time slot allows STA 200 delay broadcasting the probe request until the next WLAN time slot to avoid interfering with BT communications.

In an aspect, at block 830, methodology 800 may include broadcasting a probe request after the BT interval and during a next WLAN interval of the WLAN operations. For example, in an aspect, STA 200, transceiver module 220, and/or probe request module 243 may include a specially programmed processor module, or a processor executing specially programmed code stored in a memory, to broadcast a probe request after the BT interval and during a next WLAN interval of the WLAN operations. This provides more time for successfully receiving the probe responses and avoids interference the BT time slots. Additionally, STA 200 may receive response to the probe request, at time $t_3$, within the same WLAN slot (e.g., 712A).

As such, STA 200 may perform a WLAN scan without interfering with the operations of BT device 120.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, aspects have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

More specifically, although the example aspects are described above with respect to using Wi-Fi signals to facilitate a VoIP call and using Bluetooth signals to route audio signals associated with the VoIP call to a wireless device/headset, the example aspects are equally applicable to methods and devices using signals associated with other suitable wireless communication protocols. Thus, for other aspects, the STA 200 may facilitate the VoIP call using any suitable wireless communication protocol (e.g., using LTE, Bluetooth, or WiGig communication protocols), and may route audio signals associated with the VoIP call to a wireless headset using any suitable wireless communication protocol (e.g., using LTE, Wi-Fi, or WiGig communication protocols).

What is claimed is:

1. A method for wireless local area network (WLAN) scanning, comprising:
    initiating, by a wireless device, a scan of a WLAN at the wireless device, the wireless device being configured to share an antenna for WLAN operations and Bluetooth (BT) operations while a voice call is in progress over the WLAN and packets from the voice call are routed between the wireless device and a BT device;
    broadcasting, by the wireless device, a clear-to-send-to-self (CTS2Self) packet for reserving a communication channel for the wireless device after the scan is initiated, wherein the CTS2Self packet contains information indicating a delay period for delaying access to the communication channel;
    broadcasting, by the wireless device, a probe request after the broadcast of the CTS2Self packet, the CTS2Self packet and the probe request being broadcast during a same WLAN interval of the WLAN operations and while the voice call is in progress over the WLAN; and
    receiving, by the wireless device, one or more probe responses in response to the probe request expiration of the delay period.

2. The method of claim 1, further comprising:
    identifying whether the voice call is a synchronous connection oriented (SCO) call.

3. The method of claim 1, wherein a value of the delay period is equal to, or greater than, a time left over in the WLAN interval after the broadcast of the CTS2Self packet plus a duration of a next BT interval.

4. The method of claim 1, wherein the voice call is a voice over WLAN call.

5. The method of claim 1, wherein the scan is a roam scan.

6. An apparatus for wireless local area network (WLAN) scanning, comprising:
- means for initiating, by a wireless device, a scan of a WLAN at the wireless device, the wireless device being configured to share an antenna for WLAN operations and Bluetooth (BT) operations while a voice call is in progress over the WLAN and packets from the voice call are routed between the wireless device and a BT device;
- means for broadcasting, by the wireless device, a clear-to-send-to-self (CTS2Self) packet for reserving a communication channel for the wireless device after the scan is initiated, wherein the CTS2Self packet contains information indicating a delay period for delaying access to the communication channel;
- means for broadcasting, by the wireless device, a probe request after the broadcast of the CTS2Self packet, the CTS2Self packet and the probe request being broadcast during a same WLAN interval of the WLAN operations and while the voice call is in progress over the WLAN; and
- means for receiving, by the wireless device, one or more probe responses in response to the probe request after expiration of the delay period.

7. The apparatus of claim 6, further comprising:
- means for identifying whether the voice call is a synchronous connection oriented (SCO) call.

8. The apparatus of claim 6, wherein a value of the delay period is equal to, or greater than, a time left over in the WLAN interval after the broadcast of the CTS2Self packet plus a duration of a next BT interval.

9. The apparatus of claim 6, wherein the voice call is a voice over WLAN call.

10. An apparatus for wireless local area network (WLAN) scanning, comprising:
- a memory configured to store data; and
- one or more processors communicatively coupled with the memory, wherein the one or more processors and the memory are configured to:
  - initiate, by a wireless device, a scan of a WLAN at the wireless device, the wireless device being configured to share an antenna for WLAN operations and Bluetooth (BT) operations while a voice call is in progress over the WLAN and packets from the voice call are routed between the wireless device and a BT device;
  - broadcast, by the wireless device, a clear-to-send-to-self (CTS2Self) packet for reserving a communication channel for the wireless device after the scan is initiated, wherein the CTS2Self packet contains information indicating a delay period for delaying access to the communication channel;
  - broadcast, by the wireless device, a probe request after the broadcast of the CTS2Self packet, the CTS2Self packet and the probe request being broadcast during a same WLAN interval of the WLAN operations and while the voice call is in progress over the WLAN; and
  - receive, by the wireless device, one or more probe responses in response to the probe request after expiration of the delay period.

11. The apparatus of claim 10, wherein the one or more processors and the memory are further configured to:
- identify whether the voice call is a synchronous connection oriented (SCO) call.

12. The apparatus of claim 10, wherein a value of the delay period is equal to, or greater than, a time left over in the WLAN interval after the broadcast of the CTS2Self packet plus a duration of a next BT interval.

13. The apparatus of claim 10, wherein the voice call is a voice over WLAN call.

14. The apparatus of claim 10, wherein the scan is a roam scan.

* * * * *